(12) United States Patent
Hills et al.

(10) Patent No.: US 7,247,601 B1
(45) Date of Patent: Jul. 24, 2007

(54) METHOD FOR MAKING SILICATE/ALUMINATE SORBENT

(75) Inventors: Colin Douglas Hills, Chatham (GB); Cecilia Louise MacLeod, Chatham (GB)

(73) Assignee: University of Greenwich, London (GB)

(*) Notice: Subject to any disclaimer, the term of this patent is extended or adjusted under 35 U.S.C. 154(b) by 0 days.

(21) Appl. No.: 10/130,033

(22) PCT Filed: Nov. 10, 2000

(86) PCT No.: PCT/GB00/04314

§ 371 (c)(1),
(2), (4) Date: Oct. 15, 2002

(87) PCT Pub. No.: WO01/34294

PCT Pub. Date: May 17, 2001

(30) Foreign Application Priority Data

Nov. 12, 1999 (GB) .................................. 9926898.9

(51) Int. Cl.
*B01J 20/00* (2006.01)
(52) U.S. Cl. ..................................................... 502/407
(58) Field of Classification Search ................ 500/400, 500/407, 411, 414, 415; 502/400, 407, 411, 502/414, 415
See application file for complete search history.

(56) References Cited

U.S. PATENT DOCUMENTS

| | | | |
|---|---|---|---|
| 4,330,519 A | | 5/1982 | Takahashi et al. |
| 4,711,770 A | * | 12/1987 | Skeels et al. ............... 423/713 |
| 4,836,911 A | * | 6/1989 | Skeels et al. ........... 208/111.15 |
| 4,961,836 A | * | 10/1990 | Murphy ................. 208/111.15 |

FOREIGN PATENT DOCUMENTS

| | | |
|---|---|---|
| AT | 395 683 B | 7/1992 |
| DE | 43 07 468 A1 | 9/1994 |
| DE | 197 17723 A1 | 10/1998 |
| JP | 62-254824 | 6/1987 |
| WO | WO 99/56868 | 11/1999 |

OTHER PUBLICATIONS

Database WPI, Section Ch, Week 199425, Derwent Publications Ltd., London, GB; Class L02, AN 1994-206239, XP002162245 (Abstract), no month.
Database Chemabs 'Online! Chemical Abstracts Service, Columbus, OH, US, Matsunaga, Harue, et al., XP002152244 (Abstract), no month.
Database WPI, Section Ch, Week 199429, Derwent Publications Ltd., London, GB; Class J01, AN 1994-237718, XP002162246 (Abstract), no month.
Patent Abstracts of Japan, vol. 12, No. 252 (C-512), Publication No., 63039632, Jul. 15, 1998 (Abstract).
International Search Report, Application No. PCT/GB/00/04314, dated Mar. 19, 2001, 3 pages.

* cited by examiner

*Primary Examiner*—Edward M. Johnson
(74) *Attorney, Agent, or Firm*—Bell, Boyd & Lloyd LLP

(57) ABSTRACT

Silicate-based substantially non-hydrated sorbent material comprising predominantly calcium silicate and/or calcium alumino-silicate has an atomic framework at least partially de-calcified in that a plurality of calcium atom sites in atomic framework are vacant. The activated material can be used as industrially useful sorbents for contaminant species such as metal ions, in the solidification of waste, in similar applications, and in the absorption of carbon dioxide which might otherwise be exhausted to atmosphere. The material has a further use as a precipitant of certain ionic species e.g. lead, leading to its removal from aqueous solution by precipitation.

9 Claims, 3 Drawing Sheets pH

Figure 1:
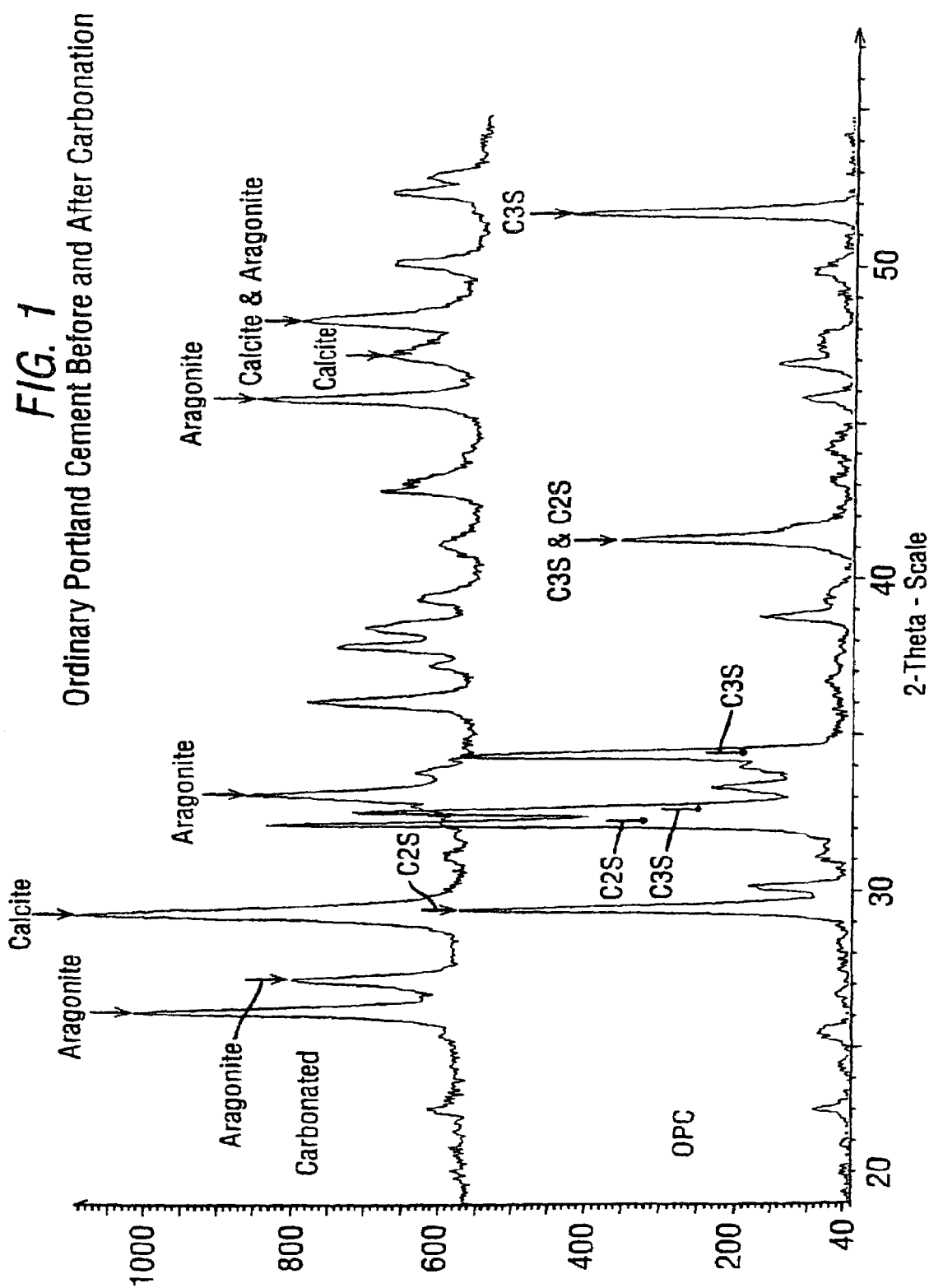

Abbreviations:
Cd/CC/N - cadmium solution mixed with carbonated cement (5g/l) under natural pH;
Cd/CaCO3/N - cadmium solution mixed with calcium carbonate (reference material (5g/l)) under natural pH;
Cd/N - cadmium solution without sorbent under natural pH;

METHOD FOR MAKING SILICATE/ALUMINATE SORBENT

This invention is concerned with silicate and/or aluminate and/or alumino silicate materials, their preparation and uses. It is more particularly concerned with calcium silicate and/or aluminate materials which have been modified by an 'activation' process to form a variety of useful sorbents or precipitants.

We have found that calcium silicate-containing materials such as clinkers and glassy residues can be 'activated' by controlled exposure to moisture and carbon dioxide. This may be easily achieved when the clinker is ground or pulverised and dampened. The exposure involves use of a $CO_2$ medium such as gaseous or other forms of carbon dioxide or mixtures containing $CO_2$. It is preferred to expose the material to carbon dioxide immediately upon dampening of the silicate material, to negate any hydraulic or latent activity of the clinker. 'Clinker' is used herein to refer to glassy or crystalline silicate and/or alumino silicate residues such as, for example, slags, hydraulic cements and latent hydraulic materials and pozzolans within the general compositional range indicated below. Starting materials for activation can comprise silicate and/or aluminate and/or alumino silicate having this oxide compositional range In more preferred starting materials for activation, aluminosilicate species are minimised or avoided Yet more preferred starting materials may essentially consist of calcium silicate (s) and calcium aluminate(s) having this oxide composition

| Oxide | % by weight compositional range |
|---|---|
| CaO | 20 to 95 |
| $SiO_2$ | 5 to 90 |
| $Al_2O_3$ | trace to 50 |
| $Fe_2O_3$ | trace to 35 |
| MgO | trace to 20 |
| Alkalis | trace to 20 |
| $SO_3$ | trace to 20 |
| Others | trace to 35 |

On exposure to carbon dioxide in the presence of a small, preferably carefully controlled amount of water (typically within the water/solids range 0.01 to 0.4). carbon dioxide has been found to become ionised and react with the clinker material. For example, where the clinker has the following major oxide composition CaO 65%; $SiO_2$ 20%; $Al_2O_3$ 6%; $Fe_2O_3$ 3% and MgO 1%, then the following reaction products have been found, namely: amorphous silica, polymorphs of calcium carbonate and gibbsite. Other reaction products have been formed depending upon the composition of the clinker Alumino silicate reaction products have been identified in the reaction products of some embodiments, for example where the starting material for activation comprises calcium silicate and aluminate phases. The 'activation' reaction involves a de-calcification reaction that can be effective in minutes even at ambient temperatures and pressures, especially so where fresh anhydrous clinker surfaces are continually exposed to carbon dioxide, given appropriate conditions. Other silicate materials may require longer periods for completion of the 'activation' reaction.

The exposure to moisture and $CO_2$ may be achieved in, for example, a processing step involving milling/crushing/grinding during or subsequent to periods of controlled carbonation.

During this exposure leading to atomic framework decalcification of the e.g. clinker material, relatively large volumes of carbon dioxide are consumed. The clinker may adsorb quantities of carbon dioxide in excess of 50% of its original dry starting weight. As such, we have found that clinkers and similar calcium silicate/alumino silicate materials have considerable potential to act as carbon dioxide sorbents, whilst simultaneously being able to 'imbibe' metallic and other ionic species that may be present (for example) in the carbon dioxide, particularly if the $CO_2$ gas stream is derived from a waste gaseous discharge. The activated starting materials within the scope of this invention may also or alternatively function as a precipitant e.g. for heavy metals in solution like lead Accordingly, the controlled application of powdered calcium silicate and/or alumino-silicate material such as clinkers to waste or spent gasses containing carbon dioxide, contaminated with ionic species such as waste metals is one aspect of the present invention.

The silica framework of the activated reaction product preferably has a residual calcium/silicon ratio of less than 1.0, but this may as low as 0.1, or lower or higher than 1.0. This reaction product contrasts with typical starting material calcium/silicon ratio usually between 5 and 1.5. The activated reaction product, apart from containing calcium carbonate unless removed or reacted with said product. is largely amorphous in nature and includes a silica framework, or alumino-silica framework which can be confirmed by x-ray diffractometry as a broad peak with a d-spacing typically of approximately 3 to 4 Angstroms. An additional peak at approximately 7 Angstroms may, or may not, also be present. When the reaction product is dominantly silicious in nature it may approximate to opaline silica in structure. A significant degree of polymerisation can take place during the moisture/$CO_2$ exposure which can be confirmed by NMR analysis of the framework structure inherent in the 'activated' material.

The framework may have been derived from, in preferred embodiments, a clinker material such as Portland cement. In spite of this, once activated the product remains substantially entirely anhydrous i.e. not hydrated and has a significant sorptive potential Activated product can be used to treat aqueous waste streams to sorb ionic and possibly non-ionic species as well as treating gaseous waste streams. In addition, the latent sorptive properties of the activated silicate product can be utilised by blending the activated material with contaminated soils or other materials The activated product also lends itself to application in barrier systems, filter systems and as a pre-solidification adsorbent, for a range of waste streams including radioactive wastes, but not limited to these. The activated product may also be used to treat, or purify, non-waste materials such as in the polishing of potable water or other liquids.

It is preferred that the starting materials for activation are preferably clinkers. The materials preferably contain aluminium, such as aluminium oxide. They may further contain iron.

The carbonation step is preferably carried out at a water solids ratio within the range 0.01 to 2.0; preferably 0.02 to 1.0; more preferably 0.05 to 0.4 The carbonation step is preferably carried out at atmospheric pressure, or up to a pressure not exceeding 30 psi (2 bar). The activated material may be a sorbent or a precipitant for certain species such as lead ions and other heavy metal ions It is preferred for the surface area of the activated product to be not less than 5 $m^2g^{-1}$. It is especially preferred for the activated product to utilise i.e. react with any carbonate salt produced during the carbonation step. It is also preferred that the starting materials for activation are essentially or entirely polycrystalline in nature, in that they are capable of diffracting X-rays but normally occur as anhedral products, in other words not as well defined crystals with parallel sides and defined axes ratios. In the activated product, it is preferred that the only significant mineral crystalline phases are calcite and aragonite. These are polymorphs of anyhydrous Ca CO$_3$. Alumino silicate crystalline starting material, which is preferred, has 4-co-ordinate (tetrahedral) and 6-co-ordinate (octahedral) Aluminium species present. It is preferred for the carbonated (activated) such material only to comprise 4-co-ordinate Aluminium species, and which is distinct structurally from the original 4-co-ordinate Al atoms. It appears that most of the Al thereby present is available for reaction.

It is most preferred for the starting material for activation to be an anhydrous polycrystalline material predominantly composed of one or more calcium silicates and/or calcium aluminates. Such polycrystalline material preferably essentially consists of calcium silicates and/or calcium aluminates material.

The activated material can combine with CO$_2$ in the presence of moisture. at ambient temperature and pressure It is not usually necessary or desirable to employ heating or cooling when using the activated product, to sorb CO$_2$.

It is preferred that the activated material after use to sorb CO$_2$ does not retain hydraulic properties, and furthermore such product after use is preferably still essentially non hydrated. The reacted such product cannot therefore be used as a cement material It is especially preferred for the reaction product to comprise a Q$^4$ amorphous silicate network in which all the Al species have become tetrahedral.

Accelerated carbonation providing the activation of the silica framework apparently imparts physical modifications to the surface of such 'activated' grains. Although surface area of the activated materials remains relatively low, atomic sized holes, preferably funnel-shaped, and typically within the size range 1 to 100 Angstroms are formed in the surface of individual grains. These holes form channels or pathways into the interior of individual grains and facilitate the sorption of other species such as the contaminants just described into the activated medium. The channels can have unusual shapes e.g. as funnels or wedges, which further enhances retention of such contaminant species within or upon the grains of activated product. In addition, by varying the chemical and physical nature of the calcium silicate and/or calcium aluminate starting material and/or the accelerated carbonation processing environment, the size and shape of such channels can be varied. In this way micro-and meso-porous materials can be engineered.

The application of decalcified, 'activated' silicate materials (such as clinker) in the treatment of aqueous solutions, non-aqueous solutions, gasses and solids, such as, for example, as a sorbent with latent potential in the treatment of e.g. contaminated land and as barrier, filter and purifying system represents a second aspect of this invention.

The present calcium silicate and/or calcium aluminate adsorbents can be produced at ordinary temperatures and pressures. However, elevated or lowered pressures and temperatures may also be used depending on the chemistry of the silicate and the type of carbon dioxide utilised. For example, where supercritical carbon dioxide is selected, the temperature regime will preferably vary between 30 and 100° C. and the pressure between 50 and 180 bar.

The clinkers that are preferred for activation have a silicate phase mineralogy dominated by di-calcium silicate (C$_2$S) and tri-calcium silicate (C$_3$S). However, they may also be composed of calcium silicates and/or calcium aluminates. Typical oxide analyses of these preferred clinkers show CaO contents of between 50% to 95%, SiO$_2$ content of 10 to 50%, and Al$_2$O$_3$ content of between 0% and 15%

Subsequently to use as a sorbent or precipitant and even when the 'activated' silicate is apparently spent, the used product may undergo re-calcination in a kiln followed by re-carbonation to reactivate the apparently spent material. Therefore, even when used for a first time and thus apparently spent, the material containing sorbed waste species can have potential for re-activation and re-use, even more than once Hence recycling of used material is contemplated. The incorporation of metallic species in particular into re-calcined clinker surprisingly seems to improve its subsequent sorptive potential upon re-activation by accelerated carbonation.

Figure 2:
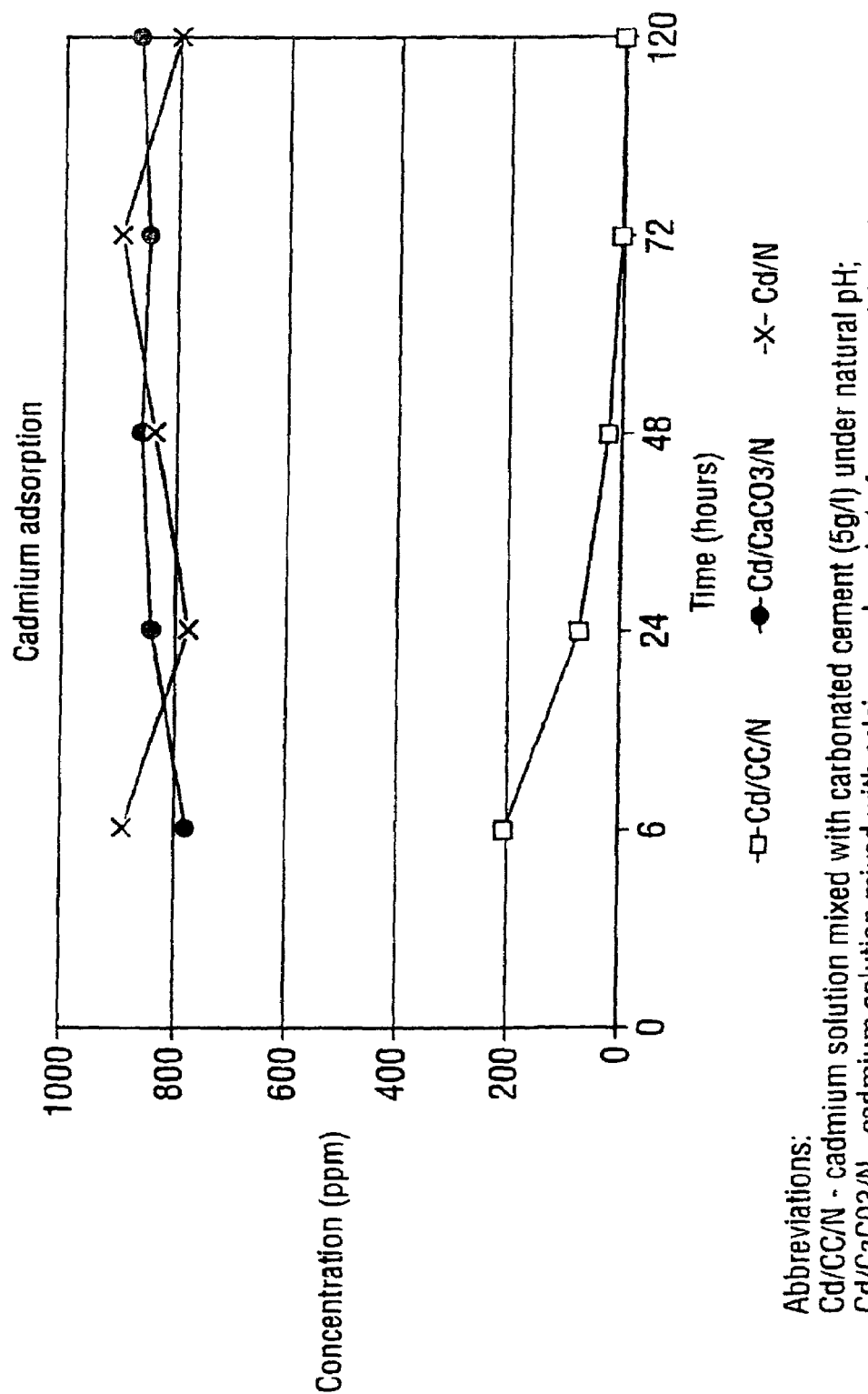

Although water, in low or trace amounts, is introduced during the activation step with CO$_2$, it is particularly preferred for there to be substantially no residual water associated with or hydrating the silica framework lattice of the activated product In order that the invention may be further appreciated, the following non-limiting examples are presented. Reference is also made to the accompanying drawings in which FIG. 1 is an X-ray diffractogram showing the phases present in ordinary Portland Cement before and after carbonation, and FIG. 2 is an example of cadmium removal using an activated product of this invention based on OPC and compared with Ca CO$_3$ It illustrates that in this embodiment, removal of Cd is by sorption and not precipitation.

Figure 3:
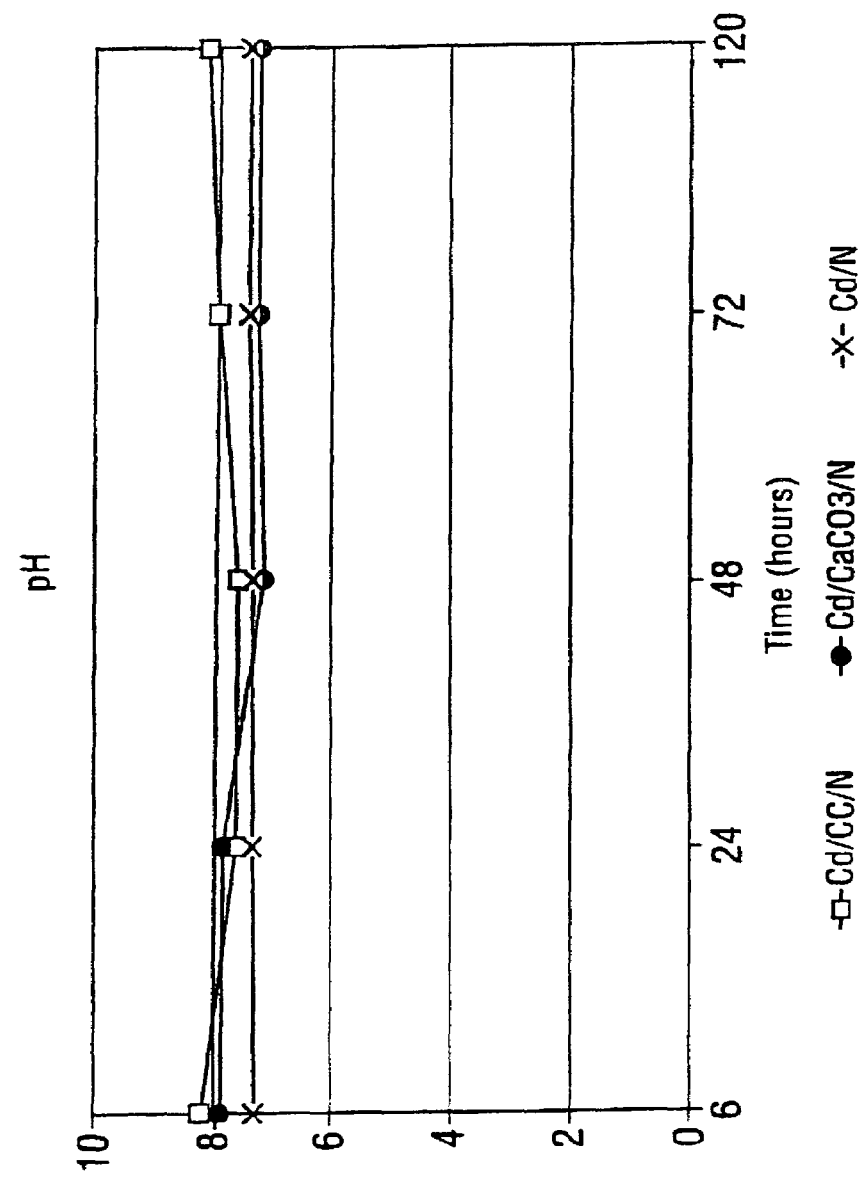

FIG. 3 is a graph illustrating the pH over time of the specimens described above. FIG. 3 indicates that the pH range of all specimens are similar.

EXAMPLE 1

A prepared, de-calcified, activated Portland cement clinker with the following approximate composition: CaO 65%, SiO$_2$ 20%, Al$_2$O$_3$ 5%, Fe$_2$O$_3$ 5%, MgO 1.5%, Alkalis, 0.7%, SO$_3$, 1.5% and LOI 1.3%, was assessed for its ability to sorb metals (i.e. metallic ions) from aqueous solution. A typical X-ray diffractogramme before and after carbonation is given in FIG. 1.

FIG. 1 shows XRD data for powdered specimens of carbonated OPC (top) and OPC. The identifiable crystalline phases of carbonated OPC are Aragonite and Calcite (polymorphs of calcium carbonate). The identifiable crystalline phases of OPC are di- and tri-calcium silicate. Hence, after carbonation essentially all of the di- and tri-calcium silicate have reacted.

A number of metal nitrate solutions were prepared with a concentration of 1000 mg metal/l. The metals chosen were copper, zinc, nickel and chromium. The solution exposed to the sorbent was sampled at intervals up to 69 hours. The amount of metals removed by the sorbent during this experiment was used to assess the sorptive capacity of the novel material.

0.5 g of sorbent was placed in an acid washed 250 ml container followed by 100 ml of each metal solution taken from a pre-prepared stock solution. All samples were prepared in triplicate from double distilled water together with control solutions containing metals without sorbent and water (blank solution) without sorbent. All the metal solutions were taken from a standard metal solution. Sample solutions were placed in a shaker at a constant temperature of 20° C. Table 1 gives the number of samples examined in this experiment

TABLE 1

Number of samples

| | |
|---|---|
| Metal solution + sorbent | 15 |
| Distilled water + sorbent | 3 |
| Metal solution only | 15 |
| Distilled water only | 3 |

Solutions were sampled at zero time, 15 minutes, 3, 14, 18, 21, 45 and 69 hours Containers were centrifuged prior to extraction of 10 ml of solution Each 10 ml sample was measured for pH and then acidified with 100 µl Aristar $HNO_3$ prior to analysis by AAS.

At the end of the example the solutions containing sorbent were centrifuged for 30 min. The remaining solution was decanted into a 100 ml container and acidified with 300 µl of Aristar $HNO_3$. The sorbent residue left in the 250 ml container was oven dried at 55° C. prior to further examination.

Analysis of Sample Solutions

Acidified single metal solutions and one multi-element solution containing all the 5 metals were prepared from a certified standard solution with the concentration 1.000 mg/l prior to analysis by AAS (PYE Unicam SP9 AAS).

The results are summarised in table 2. The difference in measured starting solution from those predicted was due to the vastly different water of crystallisation in the metal nitrate salts from that described by the reagent's manufacturer.

The concentrations of metals in solution in contact with the sorbent decreased steadily with time, however for Cu and Ni solutions equilibrium was not reached although given more time, it would be expected that more of these metals should be removable from solution an oven for a further hour at 105° C. The dry material was then weighed and ground to expose fresh silica surfaces in a mortar and pestle. Five cycles of wetting followed by carbonation and grinding were necessary to completely carbonate the clinker Complete carbonation was identified by x-ray diffractometry when the original anhydrous clinker phases, including $C_3S$, were no longer identifiable. During this example the mass of the clinker was found to increase by in excess of 50% of its initial dry weight This mass increase was due to the amount of $CO_2$ that had been adsorbed during the accelerated carbonation step X-ray diffractometry revealed a large diffraction pattern relating to the formation of calcium carbonate and broad peaks at approximately 23° C. 2-theta and 12°2-theta.

Preferred embodiments of the first aspect of the invention are based on the controlled exposure of ground clinker to a gaseous waste stream containing $CO_2$ and one or more contaminant species so that the activated clinker adsorbs considerable quantities of both gaseous $CO_2$ and such contaminants.

Preferred embodiments of the second aspect of the present invention are based on the controlled application of accelerated carbonation in order to de-calcify and hence activate the clinker to a state (calcium vacancies in framework) wherein it has latent sorptive properties. On subsequent exposure to aqueous and non-aqueous solutions, or on exposure to other waste streams, the activated clinker then acts as an industrially useful adsorbent.

Further examples of the invention, examples 1a to 14 inclusive are presented overleaf.

With reference to FIGS. 2 and 3: 1 g of carbonated sorbent was added to 200 ml of cadmium nitrate solution at an initial concentration of 1000 ppm with respect to cadmium. Plot Cd/CC/N (FIG. 2) indicates the change in concentration of cadmium as a function of time. After 72 hours essentially all of the cadmium has been removed from solution. A similar investigation in which 1 g of calcium carbonate was added to 200 ml of 100 ppm cadmium nitrate (plot Cd/CaCO3/N,

TABLE 2

Summary of results obtained

| Metal | Mean metal Concentration (zero time) | Mean metal concentration (15 mins.) | Mean metal concentration (69 hrs.) | Sorption in Mmol. Metal/ g sorbent at 69 hrs. | % decrease |
|---|---|---|---|---|---|
| Cu | 856 | 791 | 465 | 12.3 | 46% |
| Ni | 752 | 800 | 623 | 4.39 | 17% |
| Cr | 336 | 189 | 20.6 | 12.1 | 94% |
| Pb | 765 | 221 | 53.7 | 6.87 | 93% |
| Zn | 867 | 708 | 19.5 | 25.9 | 98% |

EXAMPLE 2

A commercially available cementitious clinker was prepared The approximate Bogue composition was: $C_3S$ 51%, $C_2S$ 25%, $C_3A$ 11%, $C_4AF$ 1%, $SO_3$ 2.6%, and alkalis of 0.25%.

The dry clinker was placed in a steel carbonation chamber immediately after the addition of water. The water/solids ratio used was 0.1. The chamber was purged of air and $CO_2$ gas was introduced at a pressure of 2 bar. Immediately the pressure was seen to drop as $CO_2$ gas was consumed. After approximately 1 hour, the sample was removed and dried in FIG. 2) indicates that the presence of calcium carbonate does not result in the precipitation and exclusion from solution of cadmium species Plot Cd/N shows the concentration of cadmium in a control specimen to which there were no solid additions. Hence, the mechanism of exclusion of cadmium from the solution is by sorption to the aluminosilicate matrix of the carbonated sorbent FIG. 3 indicates that the pH range of all specimens are similar.

The starting materials can be easily obtained at low cost The process requires only the use of $CO_2$ thereby producing no or minimal waste The invention is environmentally beneficial, both in its manufacture and its use Modification of the materials and/or reaction conditions in the making of the sorbent may modify its pore structure. It has been found particularly beneficial for the activated product to incorporate funnel-shaped pores Thus, varying reaction conditions using gaseous or super critical $CO_2$ provides for changes in the microcrystallinity and microporosity that can have a beneficial impact on sorbent characteristics such as sorption capacity and re-calcination potential.

One of the advantages of the activated material is that it has widespread industrial application, for example in gas stacks as a $CO_2$ absorber, in waste effluent plumes to remove metal contaminants, in water treatment systems and in remediating contaminated land.

Compared to other known sorbents, embodiments of the presently provided activated material can be produced economically and even more so by using recycled $CO_2$ discharged during cement making or other processes with the simultaneous environmental benefits of reducing greenhouse gas emissions.

exposing the wet mixture to a medium which is predominantly carbon dioxide, whereby calcium atoms in the atomic framework of the calcium silicate, dicalcium silicate or tricalcium silicate phases are carbonated thereby providing an unhydrated sorbent material in which said atomic framework of the material is at least partially decalcified by carbonation resulting in vacancy of a plurality of calcium atom sites in said framework.

2. The method as claimed in claim 1 in which the medium which is predominantly carbon dioxide is selected from the group consisting of pressurised carbon dioxide gas, supercritical carbon dioxide liquid and solid carbon dioxide.

3. The method as claimed in claim 1 in which the medium is a gaseous atmosphere which is pressurised and/or the exposure is carried out at an elevated temperature.

4. The method as claimed in claim 3 in which the exposure is carried out in a pressurised reactor which is evacuated prior to charging with carbon dioxide.

Sample Summary of Chemistry, Mineralogy and Percentage Carbon Dioxide Uptake

| Ex | Sample Source | Sample bulk Chemistry | | | | | | Other components | Dominant Mineralogy | $CO_2$ uptake (% weight gain) |
| | | CaO | $SiO_2$ | MgO | $Fe_2O_3$ | $Al_2O_3$ | LOI | wt % constituents | | |
|---|---|---|---|---|---|---|---|---|---|---|
| 1a | Ordinary Portland cement | 65.04 | 20.71 | 1.03 | 2.77 | 4.83 | 1.26 | 4.36 | $C_2S$, $C_3S$ | 22.3 |
| 2a | Stainless steel slag | 46.66 | 27.92 | 9.75 | 1.22 | 2.91 | 4.28 | 7.26 Chromium, Fluorine | $C_2S$, Merwinite Akermanite | 20.3 |
| 3 | Ash from combustion of de-inking sludge from paper recycling | 37.69 | 33.76 | 3.72 | 0.03 | 20.12 | 1.16 | 3.52 | Gehlenite, Anorthile, $C_2S$ | 16.8 |
| 4 | Pulverised Fuel Ash | 3.36 | 46.96 | 1.76 | 11.33 | 23.71 | 5.66 | 7.22 | Amorphous, + Small % Quartz | 1.2 |
| 5 | Ground Granulated Blastfurnance Slag | 41.38 | 34.59 | 6.84 | 1.51 | 14.02 | 0.00 | 1.66 | Amorphous | 2.8 |
| 6 | Municipal Solid Waste Incineration Ash | 35.89 | 15.29 | 1.29 | 1.11 | 6.25 | 26.23 | 13.94 Chlorine, Sodium, Potassium, Sulphate | NaCl, KCl, CaSO4 | 14.0 |
| 7 | Municipal Solid Waste Incineration Ash | 22.62 | 10.32 | 1.61 | 0.95 | 5.30 | 34.42 | 24.78 Chlorine, Sodium, Potassium, Sulphate | NaCl, KCl, CaSO4 | 6.5 |
| 8 | Precipitated calcium silicate powder | 56.00 | 44.00 | | | | | | Amorphous | 9.0 |
| | Materials below have approximate bulk chemistry | | | | | | | | | |
| 9 | Cupola Arrester filter cake | 8 | 15 | 2 | 23 | 4 | 0 | 49 −32% Zn from perchloric acid digest | Zn oxides, Magnetite | 7.5 |
| 10 | Steel Slag | 46 | 10 | 3 | 1 | 32 | 0 | 9 | Fluorite, Akermanite, Gehlenite | 2.7 |
| 11 | Steel Slag | 11 | 40 | 35 | 1 | 8 | 0 | 6 | Olivine, | 0.6 |
| 12 | Cyclone Dust | 6 | 30 | 1 | 39 | 6 | 17 | 2 | Quartz, Magnetite | 2.4 |
| 13 | Cupola Furnance Dust | 25 | 30 | 1 | 23 | 4 | 0 | 18 | Un identified | 3.7 |
| 14 | Slag | 37 | 41 | 2 | 1 | 12 | 0 | 9 | Amorphous | 0.6 |

The invention claimed is:

1. A method of making a sorbent material which comprises:

providing a calcium silicate-based clinker or glassy residue including calcium silicate, dicalcium silicate or tricalcium silicate phases:

grinding or pulverising said clinker or glassy residue;

adding water to the ground or crushed clinker or glassy residue at a water/solid weight ratio of up to 0.4:1 to form a wet mixture; and 5. The method as claimed in claim 1 which is operated more than once as a batch process, wherein during or between at least one successive exposure to said medium, said calcium silicate-based clinker or glassy residue is further ground or pulverised or milled to expose additional surface of said clinker or glassy residue for said exposure.

6. The method as claimed in claim 1 in which the exposure is carried out at an elevated temperature.

7. A method of making a sorbent material which comprises:

providing a calcium silicate-based clinker or glassy residue including calcium silicate, dicalcium silicate or tricalcium silicate phases:

grinding or pulverising said clinker or glassy residue;

adding water to the ground or crushed clinker or glassy residue at a water/solid weight ratio of up to 0.4:1 to form a wet mixture; and exposing the wet mixture to a medium which is a waste gas stream containing carbon dioxide and one or more waste species, whereby calcium atoms in the atomic framework of calcium silicate, dicalcium silicate or tricalcium silicate phases of the calcium silicate-based material are carbonated thereby providing an unhydrated sorbent material in which said atomic framework of the material is at least partially decalcified by carbonation resulting in vacancy of a plurality of calcium atom sites in said framework.

8. The method as claimed in claim 7 in which the exposure is carried out in a pressurised reactor which is evacuated prior to charging with the waste gas stream containing carbon dioxide.

9. The method as claimed in claim 7 which is operated more than once as a batch process, wherein during or between at least one successive exposure to said medium, the calcium silicate-based clinker or glassy residue is further ground or pulverised or milled to expose additional surface of the clinker or glassy residue for said exposure.

* * * * *